United States Patent [19]

Pape et al.

[11] Patent Number: 5,023,996
[45] Date of Patent: Jun. 18, 1991

[54] MULTIPLE BLADE HANDSAW

[75] Inventors: Robert Pape, Newtown; William Rose, Hartford, both of Conn.; Frank Burgel, Scarsdale, N.Y.; Chip Adams, Deep River, Conn.

[73] Assignee: Sonin, Inc., Scarsdale, N.Y.

[21] Appl. No.: 491,472

[22] Filed: Mar. 9, 1990

[51] Int. Cl.⁵ .............................................. B25F 3/00
[52] U.S. Cl. .......................................... 30/144; 7/150; 30/125
[58] Field of Search ................. 30/123, 125, 142, 144, 30/166.3, 517; 7/149, 150, 158, 163

[56] References Cited

U.S. PATENT DOCUMENTS

| 2,039,850 | 5/1936 | Silas | 30/123 X |
|---|---|---|---|
| 2,280,463 | 4/1942 | Williamson | 30/123 X |
| 2,305,476 | 12/1942 | Johnson | 30/144 |
| 2,631,368 | 3/1953 | Baukus | 30/144 |
| 2,820,291 | 1/1958 | Philippar | |
| 4,271,592 | 6/1981 | Hoptner | 30/153 |
| 4,630,373 | 12/1986 | Staurseth | 30/514 |
| 4,660,284 | 4/1987 | Decarolis | 30/157 |

*Primary Examiner*—Douglas D. Watts
*Attorney, Agent, or Firm*—Pollock, Vande Sande & Priddy

[57] ABSTRACT

A combination handsaw providing one of a plurality of blades. A pair of blade housings are pivoted together at one end, supporting first and second blades of different types for cutting. The blade housings receive each of the blades in a retracted, non-cutting position, and permit deployment of the blades out one end of each respective housing for cutting operations. A utility knife is contained in one end of the housings, permitting yet another cutting blade or a single device.

7 Claims, 4 Drawing Sheets

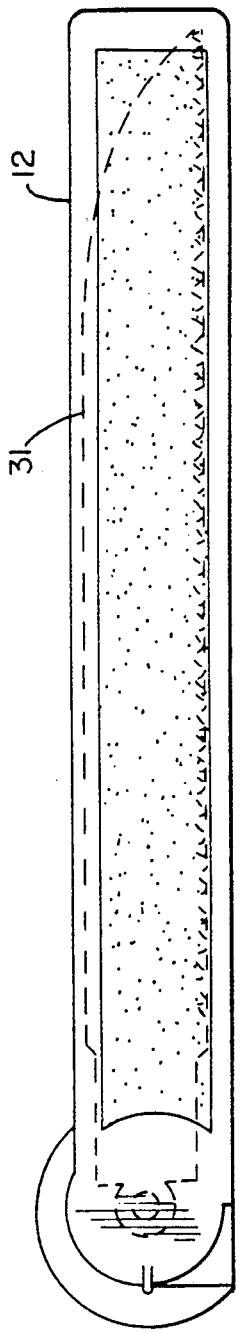
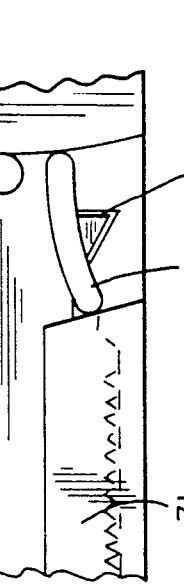
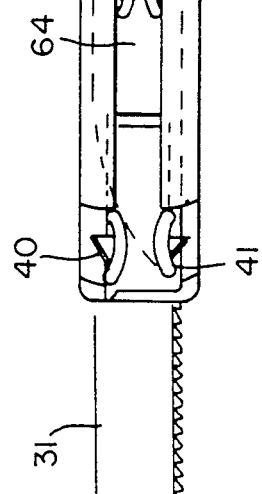
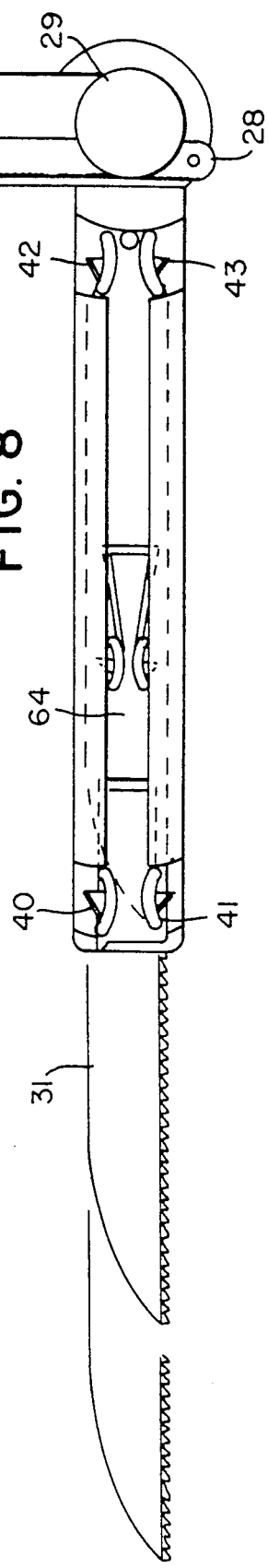
FIG. 6
FIG. 7
FIG. 8

MULTIPLE BLADE HANDSAW

The present invention relates to a handsaw which provides multiple cutting edges in a single hand-carried package. Specifically, a handsaw is provided having first and second blades, either one of which may be deployed for cutting operations.

Most domestic cutting operations require either a metal cutting blade such as a conventional hacksaw blade, or a wood cutting blade. Saws for cutting metal, such as a hacksaw, and saws for cutting wood are typically single unitary devices. For most household repairs, one or the other is needed, depending on the material being cut. In other circumstances, household cutting tools are required having a straight, non-toothed razor edge, such as for cutting linoleum, string or goods which would otherwise not be cut with a metal cutting hacksaw or wood saw.

The diverse cutting operations for household needs do not therefore lend themselves to use of a single tool. The interruption and disadvantage to making repairs which may call for multiple blade types is obvious.

SUMMARY OF THE INVENTION

It is an object of this invention to provide a cutting tool capable of providing multiple blades.

It is a more specific object of this invention to provide a cutting tool in a single package which permits deployment of the specific blade type needed for a given cutting operation.

It is yet another object of this invention to provide a measurement capability in a handsaw which provides multiple blade types.

These and other objects of the invention are provided by a single tool, including multiple blade types for various cutting operations. The single tool includes a first and second blade housing, which are stored in a face to face relationship when not being used. The two blade housings are pivoted together at one end, permitting the pair of housings to be displaced with respect to each other at one end.

Each of the blade housings contains a retractable blade. The first housing includes a hacksaw blade which may be deployed through one end of the housing and locked in place to permit metal cutting operations.

The second housing includes a saw blade which is adaptable for cutting wood. The saw blade is extended through an opening of the second housing, and locked in place to permit wood cutting operations.

In a preferred embodiment of the invention, a utility knife is also included in one of the housings. The utility knife may be removed from the housing and used to effect those cutting operations calling for this type of blade. Additionally, the embodiment including a utility knife has a notch within the housing disposed above the utility knife blade to permit string to be inserted and cut without removing the utility knife from the housing.

DESCRIPTION OF THE FIGURES

FIG. 6 is a section view illustrating the housing 12 for storing the wood cutting blade 31.

FIG. 7 illustrates the support and catch for the wood cutting blade 31.

FIG. 8 illustrates the procedure for deploying the wood saw blade 31.

DESCRIPTION OF THE PREFERRED EMBODIMENT

Figure 1:
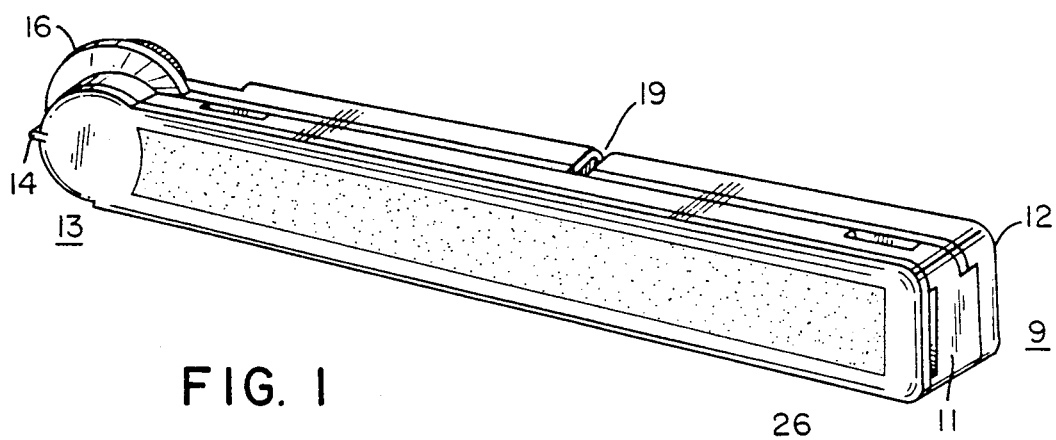
FIG. 1 is a perspective view of the combination handsaw in accordance with a preferred embodiment.
Figure 2:
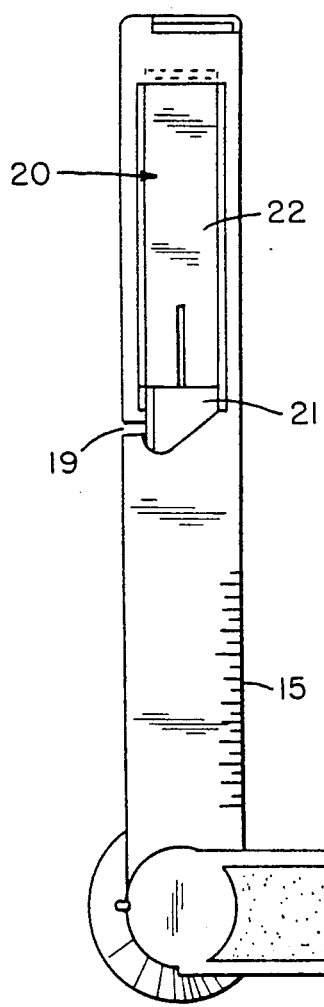
FIG. 2 is a front plan view of the combination handsaw of FIG. 1.

FIG. 1 is a perspective view of the combination handsaw in its closed, blade stored position. The handsaw includes two housings, 11 and 12, which are connected together at one end 13 such that the housings are free to pivot with respect to each other. The pivot end 13 of the housings include a protractor 16 on one housing 12, and an indicia 14 on the remaining housing 11. When the opposite ends 9 of the housings 11 and 12 are pivoted apart as shown in FIG. 2, the indicia 14 and protractor 16 will provide an indication of the relative angular displacement between each of the housings 11 and 12. Measurement indicia may be included along one edge 15 of housing 12, or housing 11, such that a convenient measuring rule is provided.

When the saw is deployed in the condition of FIG. 2, a utility knife 20 is exposed, having a blade 21 connected to a handle 22. The utility knife 20 resides within a cavity in the housing 12 and has a cutting edge facing a notch 19. The notch 19 permits string or other material strands to be cut conveniently without removing the knife 20 from its compartment.

Figure 3:
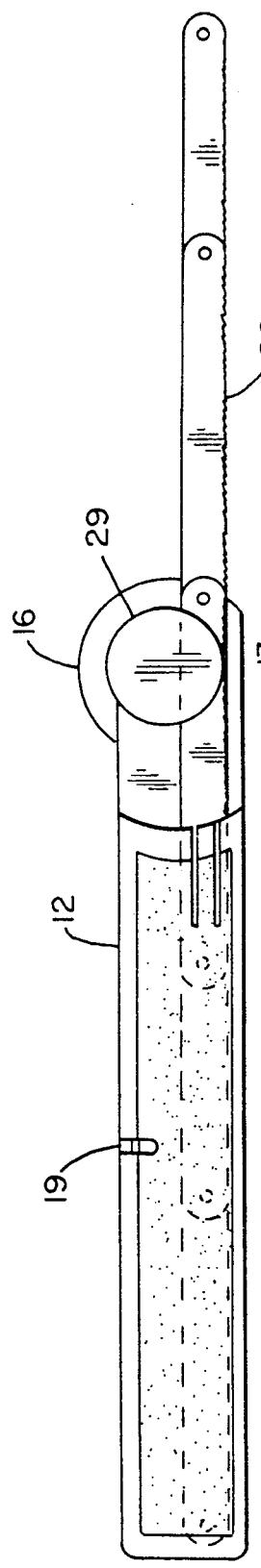
FIG. 3 illustrates the combination handsaw when the metal cutting blade 28 is deployed.
Figure 4:
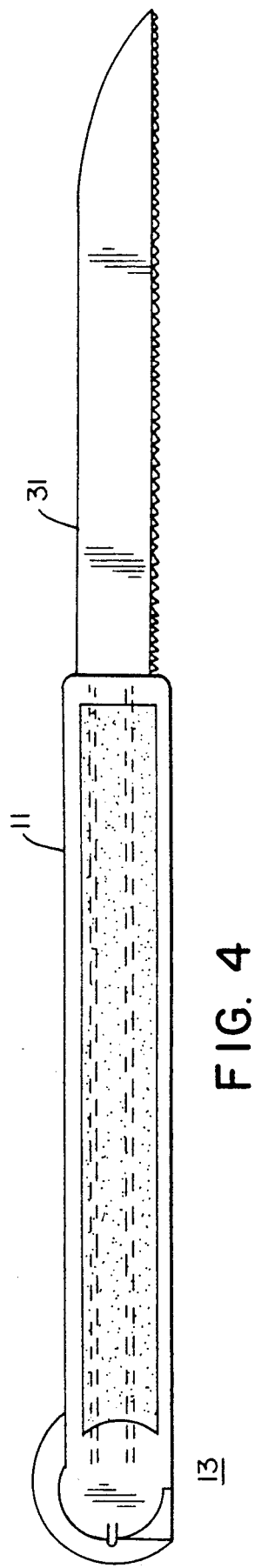
FIG. 4 illustrates the combination handsaw when the wood cutting blade 31 is deployed.
Figure 5:
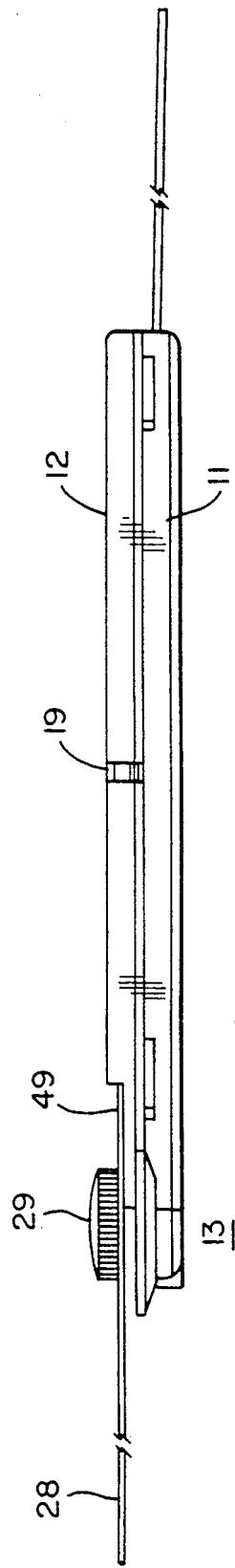
FIG. 5 is a top view of the handsaw.

Referring to FIGS. 3, 4 and 5, the combination saw is shown deploying each of the blades 28 and 31. In FIG. 3, the conventional hacksaw blade 28 is shown, supported within the housing 12, passing between the housing 12 and a knurled knob 29 contained at the pivot end 13 of the respective housings 11, 12. A slot in the end of housing 12 permits the blade 28 to be deployed and locked in place by the knurled knob 29. FIG. 5 illustrates how the knurled knob 29 maintains the extended blade 28 against the exterior surface of the housing portion 49 having reduced width.

As FIG. 4 illustrates, the wood saw blade 31 may be extended beyond a second opening in an opposite end of housing 11.

The housing 12 containing the wood saw blade 31 is shown more completely in FIGS. 6, 7 and 8. Referring specifically to these Figures, it can be seen that the blade 31, residing within the housing 12, is movable from a first position completely enclosed within the housing to an extended position through the aforementioned opening in the housing 12. The blade 31 is supported at one end by a pair of displaceable slides 34 and 35 which are spring biased outwardly from each other. The displaceable slides 34 and 35 include first and second catches 36 and 37. The catches 36 and 37, under the influence of the biasing spring between slides 34 and 35, are received in a pair of notches 42 and 43 or 40 and 41, depending on the position of the blade. These notches are connected by a longitudinal slot 64 formed in the face of the housing 12. The catches 36 and 37, when moved toward each other, permit the slides 34 and 35 to move with the entire blade 31 to one or the other positions for blade 31.

Figure 9:
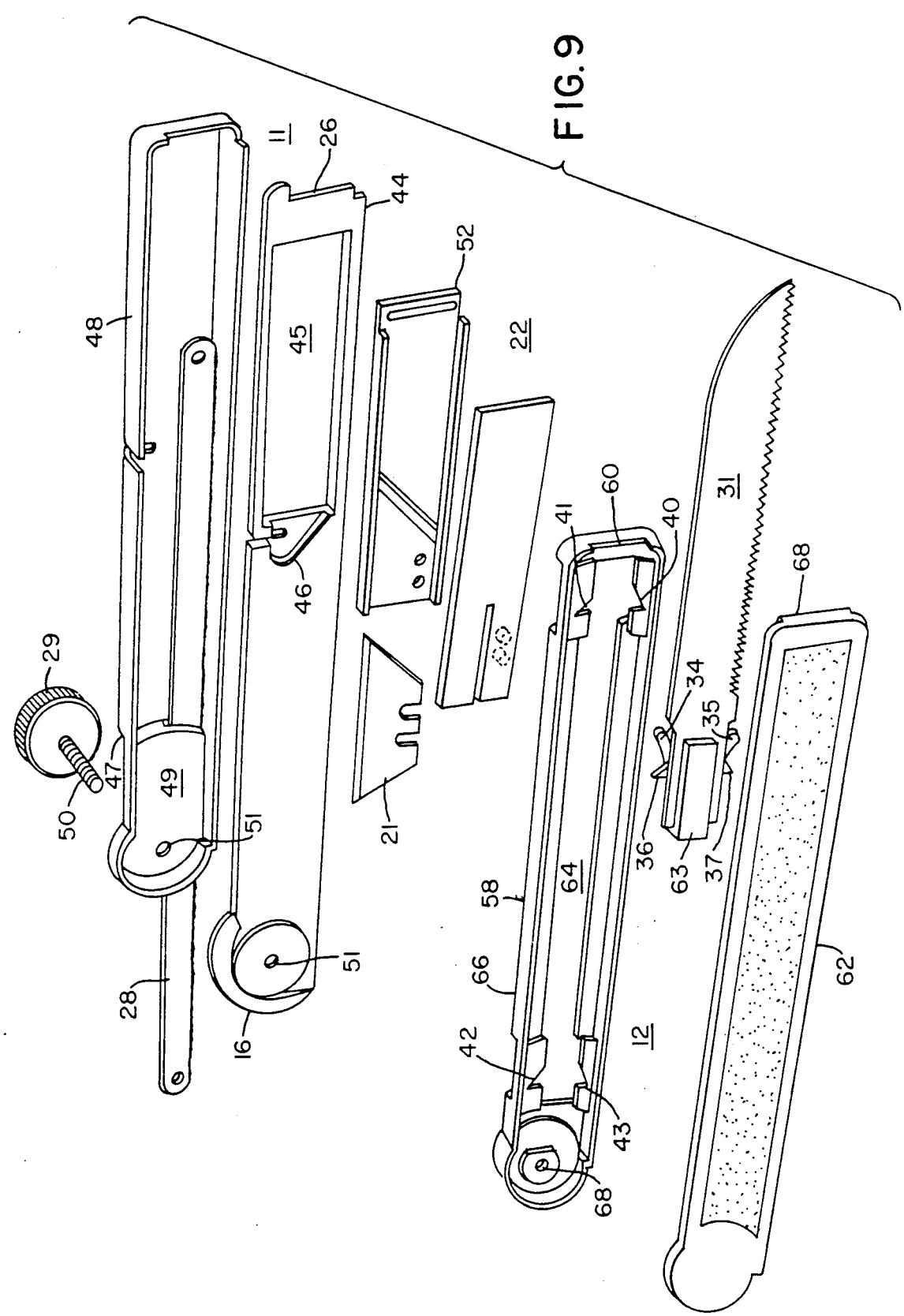
FIG. 9 is an exploded view of the combination saw.

Referring now to FIG. 9, an exploded view of the combination saw is shown. In this Figure, a knurled knob 29 is shown connected to a threaded shaft 50. The threaded shaft 50 holds the housings 11 and 12 together via clearance holes 51 and 68 in each of the housings. A captivated nut, not shown, contained within housing cover 62 receives the end of threaded shaft 50. The knurled member 29 permits the saw blade 28 to be extended or retracted within the housing 48. Once deployed, the knurled member 29 can thread shaft 50 into the captivated nut to hold the blade 28 rigidly with respect to the housing 11. As can be seen from the exploded view of FIG. 9, housing 48 has a narrow portion 49, permitting the blade 28 to be rigidly supported as well as exposed to contact the knurled member 29.

The cover 44 for the housing 11 includes an aperture 45, dimensioned to receive utility knife 22. A sheath 46 is shown, molded in the cover 44, such that the blade portion of knife 22 is retained by sheath 46. A detent 52 on one end of the blade handle retains the remaining end of the utility knife 22 within the housing 11.

The second housing 12 is shown to contain a cover 66 having a slot 64 therein for receiving each of the slides 34 and 35 carried on the knife. A block 63 is provided to reduce the clearance between the housing 12 and the rear portion of the knife 31.

The slot 64 is shown to contain at each end thereof, notches 40, 41 and 42, 43. As was explained with respect to FIGS. 7 and 8, these retain the wood cutting blade 31 in either its stored position or extended position through slot 60. The cover member 62 bears the nut, holding the shaft 50 secure to housing 12.

A slot 26 is provided for the non-pivoting end for housing 12, to receive a protruding stop 68 on the housing cover 62. This will maintain the two housings 11 and 12 so that rotation of the two free housing ends occurs only in one direction.

Figure 10:
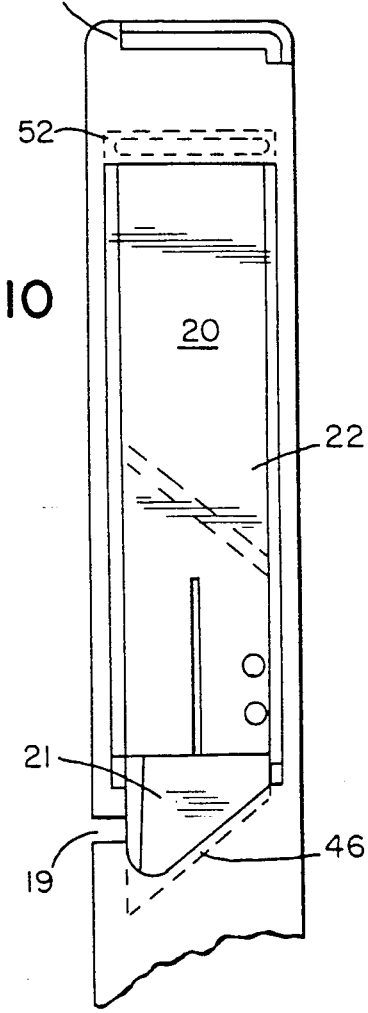
FIG. 10 illustrates the knife 20 retained within the housing 12.

FIG. 10 illustrates the knife 20 when it is inserted within the compartment provided in housing 12. The knife sheath 46 retains the knife 21 while the detente end 52 is retained within the housing 12.

Thus, there is described a handsaw providing multiple cutting blades. Those skilled in the art will recognize yet other embodiments described more particularly, but not limited to, the claims which follow.

What is claimed is:

1. A combination handsaw comprising:
   a first blade housing having on an inside face thereof a longitudinal slot for supporting a first blade for movement along a longitudinal axis of said blade housing so that said blade may be moved from a retracted position within said housing to an extended position, whereby a major portion of said blade extends through one end of said housing;
   a second blade housing supporting a second blade for longitudinal movement through one end of said second blade housing to an extended position, whereby a major portion of said blade extends outside one end of said housing; and
   pivot support for connecting first ends of said housings together, permitting opening of said housings from a coextensive closed position in facing relationship to an open position with spaced apart second ends.

2. The combination handsaw of claim 1 further comprising a removable knife supported for storage in one of said housings.

3. The combination handsaw of claim 2 further comprising a notch located in said housing supporting said removable knife at a location adjacent a blade of said knife.

4. The combination handsaw of claim 1 wherein said second blade housing is open at said first end adjacent to said pivot means, permitting said second blade to extend beyond said pivot means.

5. The combination handsaw of claim 4 wherein said pivot means comprises a knurled knob supporting a threaded shaft, said threaded shaft extending through said first housing first end and received in a threaded support within said second housing first end.

6. The combination handsaw of claim 1 wherein said first housing longitudinal slot supports a pair of spring biased slides on said first blade, said slot including at opposite ends thereof a pair of notches for retaining said pair of slides in first and second positions.

7. The combination handsaw of claim 5 wherein said knurled knob maintains said second blade in an extended position.

* * * * *